United States Patent
Morikawa et al.

(10) Patent No.: US 6,743,749 B2
(45) Date of Patent: Jun. 1, 2004

(54) PHOTOCATALYST

(75) Inventors: Takeshi Morikawa, Aichi (JP);
Takahiro Shiga, Aichi (JP); Ryoji Asahi, Aichi (JP); Takeshi Ohwaki, Aichi (JP); Yasunori Taga, Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 10/181,918

(22) PCT Filed: Jan. 25, 2001

(86) PCT No.: PCT/JP01/00481
§ 371 (c)(1),
(2), (4) Date: Jul. 26, 2002

(87) PCT Pub. No.: WO01/54811
PCT Pub. Date: Aug. 2, 2001

(65) Prior Publication Data
US 2003/0013607 A1 Jan. 16, 2003

(30) Foreign Application Priority Data

Jan. 27, 2000 (JP) ........................................ 2000-018551
Jan. 27, 2000 (JP) ........................................ 2000-019310

(51) Int. Cl.[7] ............................ B01J 23/00; B01J 23/40; B01J 27/24; B01J 8/00; C01G 21/047
(52) U.S. Cl. .................... 502/349; 502/350; 502/326; 502/200; 502/216; 502/222; 502/223; 502/242; 423/239.1; 423/610
(58) Field of Search .................... 502/349, 350, 502/326, 200, 216, 222, 223, 242; 423/239.1, 610

(56) References Cited

U.S. PATENT DOCUMENTS 6,077,492 A * 6/2000 Anpo et al. ............... 423/239.1

2002/0006865 A1 * 1/2002 Morikawa et al. .......... 502/200
2002/0169076 A1 * 11/2002 Takeshi et al. ............. 502/350

FOREIGN PATENT DOCUMENTS

| EP | 0 924 164 A2 | 6/1999 |
| JP | 8 131841 | 5/1996 |
| JP | 8 134630 | 5/1996 |

(List continued on next page.)

OTHER PUBLICATIONS

S. Sato, et al., Chemical Physics Letters, vol. 123, No. 1,2, pp. 126–128, "Photocatalytic Activity of No Doped $TiO_2$ in the Visible Light Region", Jan. 3, 1986.

(List continued on next page.)

*Primary Examiner*—Mark L. Bell
*Assistant Examiner*—Patricia L. Hailey
(74) *Attorney, Agent, or Firm*—Oblon, Spivak, McClelland, Maier & Neustadt, P.C.

(57) ABSTRACT

A Ti—O—N film is formed on an $SiO_2$ substrate by sputtering. For example, $TiO_2$ is used as a target and nitrogen gas is introduced into the atmosphere. Crystallization is carried out by a post-sputtering heat treatment. Then a charge separation material such as Pt is supported on the Ti—O—N film. With the fabricated $TiO_2$ crystals, the Ti—O—N film containing nitrogen exhibits a good catalytic reaction by using visible light as acting light. Since the charge separation material captures electrons or positive holes, recombination of electrons and positive holes is effectively prevented, and consequently more efficient photocatalytic reaction is performed. It is preferable to form a photocatalyst material film (Ti—Cr—O—N film) by sputtering the $SiO_2$ substrate by use of $TiO_2$ and Cr as the target in a nitrogen atmosphere. Crystallization is performed by a post-sputtering heat treatment.

12 Claims, 10 Drawing Sheets

STRUCTURE IN FIRST EMBODIMENT

FOREIGN PATENT DOCUMENTS

| | | |
|---|---|---|
| JP | 9 942 | 1/1997 |
| JP | 9 262482 | 7/1997 |
| JP | 10-152396 | 6/1998 |
| JP | 11-180736 | 7/1999 |
| JP | 11-267519 | 10/1999 |
| JP | 2000-70709 | 3/2000 |
| JP | 2000-103621 | 4/2000 |
| JP | 2000 140636 | 5/2000 |
| JP | 2000-143241 | 5/2000 |
| JP | 2001-72419 | 3/2001 |
| JP | 2001-347162 | 12/2001 |
| JP | 2001-354422 | 12/2001 |
| WO | 97 26991 | 7/1997 |
| WO | 98 23374 | 6/1998 |
| WO | 01 10552 | 2/2001 |
| WO | 01 10553 | 2/2001 |

OTHER PUBLICATIONS

H. Noda, et al., Chemical Society of Japan Report, No. 8, pp. 1084–1090, "Method for Preparing Titanium Oxide (IV) and Its Characterization", 1986 (with partial English translation), no month avail.

Written Reply filed on Apr. 25, 2003 (with English translation) for JP Appl. 2001–515057.

\* cited by examiner

STRUCTURE IN FIRST EMBODIMENT

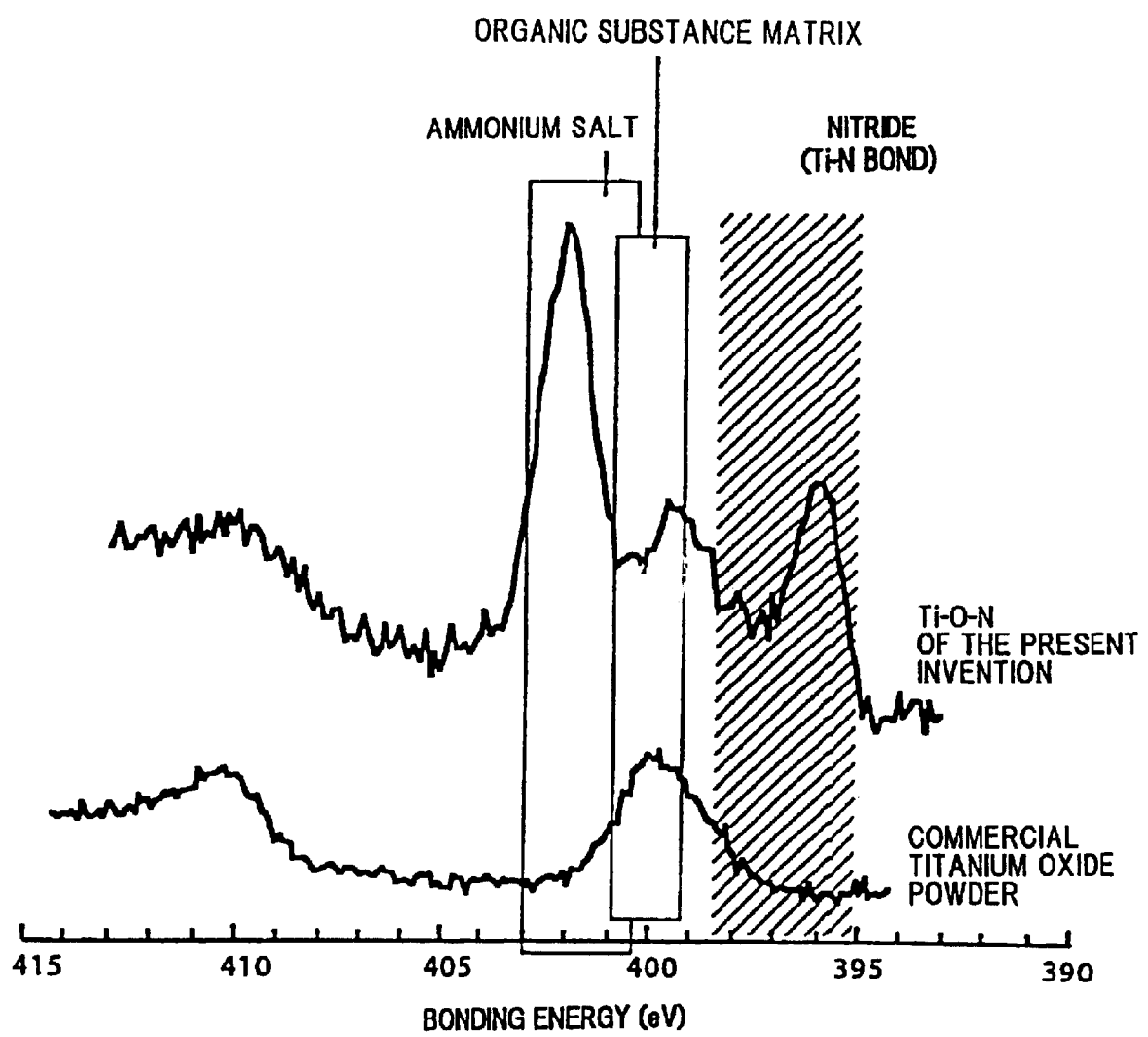

STRUCTURE IN ANOTHER EMBODIMENT

PHOTOCATALYST

TECHNICAL FIELD

The present invention relates to a photocatalyst that can produce effects when exposed to visible light.

BACKGROUND ART

Conventionally, various materials such as, for example, $TiO_2$ (titanium dioxide), CdS (cadmium sulfide), $WO_3$ (tungsten trioxide), and ZnO (zinc oxide) are known as materials for producing photocatalytic effects. These photocatalytic materials are semiconductors which absorb light to produce electrons and holes, and cause various chemical reactions and disinfection effects. Currently, the only material put in practice is $TiO_2$, because $TiO_2$ is superior in consideration of toxicity and stability with respect to exposure to water, acids, and bases.

However, because of the band gap value of $TiO_2$ (Eg=3.2 eV in an anatase crystal), the operational light of the $TiO_2$ photocatalyst is limited to ultraviolet light having a wavelength of less than 380 nm. In order to allow satisfactory operation under sunlight, indoors, or in a vehicle, and to improvement catalytic activity when light of weak intensity is irradiated, there is strong demand for development of a material which can realize catalytic activity when irradiated by visible light having a wavelength longer than or equal to 380 nm.

For example, Japanese Patent Laid-Open Publication No. Hei 9-262482 discloses modification of material through ion implantation of a metal element such as, for example, Cr (chromium), and V (vanadium) to an anatase $TiO_2$ which has a high catalytic activity, in order to shift the light absorption edge of $TiO_2$ towards a longer wavelength and to thereby enable operation of a $TiO_2$ catalyst under visible light. Although doping of Cr, V, or the like has been reported since the early 1970's, none of the early reports disclose that operation by visible light is enabled. In Japanese Patent Laid-Open Publication No. Hei 9-262482, operation by visible light are enabled by using a special doping method, ion implantation, for Cr, V, or the like.

In the above conventional art, operability under visible light of a $TiO_2$ photocatalyst is enabled through ion implantation of a metal element to $TiO_2$. However, ion implantation of a metal element is likely to require large and expensive apparatus. To this end, there is a demand for synthesizing the $TiO_2$ photocatalyst through other methods, such as, for example, synthesis in solution or sputtering. However, photocatalyst created through these methods cannot operate by visible light. It is considered that this is because aggregation of the dopant, Cr, occurs or because oxides such as $Cr_2O_3$ are formed during the crystallization processes. As described, in the conventional art, there has been a problem that, in order to enable operation of $TiO_2$ by visible light using a metal element, ion implantation of the metal element is required.

DISCLOSURE OF INVENTION

One object of the present invention is to realize a $TiO_2$ photocatalyst capable of operating in the visible light in addition to the ultraviolet range by using a novel material and without using costly production methods such as ion implantation.

According to a first aspect of the present invention, there is provided a photocatalyst comprising, as an inner material, a titanium compound (Ti—O—N or Ti—O—S) in which a nitrogen atom (N) or a sulfur atom (S) substitutes for a portion of the oxygen site of crystals of titanium oxide (for example, $TiO_2$), is doped at an interstitial site of the crystal lattices of titanium oxide, or is placed at the grain boundary of polycrystalline assembly of titanium oxide crystals, and wherein a charge separation material is partially supported on the surface of the titanium compound.

Ti—O—N or Ti—O—S are titanium compounds obtained by introducing nitrogen or sulfur to titanium oxide crystals and have an active photocatalytic function not only when exposed to light in the ultraviolet range, but also under light in the visible range. Therefore, the photocatalytic function similar to that in $TiO_2$ can be obtained with visible light as the operational light.

Moreover, a charge separation material can be partially supported on the surface of Ti—O—N or Ti—O—S. As the charge separation material, for example, at least one of Pt, Pd, Ni, $RuO_x$ (for example, $RuO_2$), $NiO_x$ (for example, NiO), $SnO_x$ (for example, $SnO_2$), $Al_xO_y$ (for example, $Al_2O_3$), $ZnO_x$ (for example, ZnO), and $SiO_x$ (for example, $SiO_2$) may be selected. Such a charge separation material acts as a promoter and facilitates separation of charges produced as a result of irradiation of light. That is, a metal element such as Pt, Pd, and Ni selectively captures electrons and an oxide such as $RuO_x$ (for example, $RuO_2$), $NiO_x$ (for example, NiO), $SnO_x$ (for example, $SnO_2$), $Al_xO_y$ (for example, $Al_2O_3$), $ZnO_x$ (for example, ZnO), and $SiO_x$ (for example, $SiO_2$) selectively captures holes. Therefore, by partially supporting these materials on the surface of the photocatalytic material, the probability of recombination of electrons and holes produced by the photocatalytic reaction is reduced and, thus, reduction in activity caused by the recombination of electrons and holes can be prevented.

It is preferable that the ratio, X %, of number of atoms of N in Ti—O—N be 0<X<13. A similar ratio is preferable for the S in Ti—O—S. It is also preferable that, when the metal element or oxide is assumed to be uniformly supported, the amount of the metal element or oxide on the surface which acts as a promoter corresponds to a thickness of 0.1 angstrom (Å) to 10 Å. In the case of $SiO_x$, it is preferable that the corresponding amount be 10 Å to 500 Å. In reality, these promoters on the surface forms an island-like structure and may not be present entirely over the Ti—O—N or Ti—O—S surface.

According to another aspect of the present invention, it is preferable that the Ti—O—N or Ti—O—S is used as an inner material, a titanium oxide layer is formed on the surface of the inner material, and a charge separation material is partially supported on the surface of the titanium oxide layer.

By employing such a structure, it is possible for the inner Ti—O—N or Ti—O—S to absorb light in the range from ultraviolet to visible while allowing catalytic reaction by the titanium oxide on the surface and the charge separation material partially supported thereon. Titanium oxide is inexpensive and stable, and an effective catalytic reaction can be realized while preventing recombination of electrons and holes by Pt, Pd, Ni, $RuO_x$ (for example, $RuO_2$), $NiO_x$ (for example, NiO), $SnO_x$ (for example, $SnO_2$), $Al_xO_y$ (for example, $Al_2O_3$), $ZnO_x$ (for example, ZnO), and $SiO_x$ (for example, $SiO_2$).

According to another aspect of the present invention, there is provided a photocatalytic material comprising an oxide crystal of a metal element M1, the oxide crystal having a photocatalytic function, in which a nitrogen atom or a sulfur atom substitutes for a portion of the oxygen sites of the oxide crystals, is doped at an interstitial site of the crystal lattices of oxide, or is placed at the grain boundary of the polycrystalline body of oxide crystals, and wherein at least one metal element M2 of vanadium (V), chromium (Cr), manganese (Mn), iron (Fe), cobalt (Co), nickel (Ni), copper (Cu), zinc(Zn), ruthenium (Ru), rhodium (Rh), rhenium (Re), osmium (Os), palladium (Pd), platinum (Pt), iridium (Ir), niobium (Nb), and molybdenum (Mo) substitutes for a portion of the M1 sites of the oxide crystal, is doped at an interstitial site of the crystal lattices of the oxide, or is placed at the grain boundary of the polycrystalline body of the oxide crystals.

Here, it is preferable that the compositional ratio of nitrogen exceeds 0 and is less than 13 in the ratio percent of number of atoms and that the compositional ratio of various metal elements exceeds 0 and is less than 5 in the ratio percent of number of atoms. The compositional ratio of sulfur is similar to that of nitrogen.

In such a photocatalytic material, the absorption edges in the light absorption spectrum are shifted towards a longer wavelength compared to $TiO_2$, Ti—O—N, and Ti—O—S. Therefore, light of a longer wavelength is absorbed and generates a photocatalytic effect. As a result, the efficiency of photocatalytic functions, that is, characteristics such as decomposition of organic matters, decomposition of poisonous gases, purification of water, or the like, can be improved for cases when the sunlight or fluorescent lamp is used as a light source. Moreover, the photocatalytic material enables realization of hydrophilic characteristic and anti-fogging property on the surface not only by irradiation of ultraviolet ray, but also by irradiation of visible light, and maintains such characteristic for a longer period of time.

The cause of this can be considered as follows. The valence band of a semiconductor whose characteristics are dominated by oxygen, O, is affected by doping of nitrogen, N, or sulfur, S. Similarly, conduction band characteristics dominated by Ti are affected by the doping of metals. As a result, one or more new energy levels are created within the band gap (forbidden band) of the oxide such as $TiO_2$, and the effective band gap is narrowed. Consequently, electrons and holes can be produced by absorbing light of lower energy and longer wavelength than in the cases of $TiO_2$, Ti—O—N, and Ti—O—S.

According to another aspect of the present invention, it is preferable that the metal element M1 be formed from any of titanium (Ti), zinc (Zn), and tin (Sn). The oxide of these metal elements M1 functions as a photocatalyst, and the operational light is shifted towards longer wavelength by doping a metal element M2 as described above.

According to another aspect of the present invention, it is preferable that the photocatalytic material is used as an inner material, and that a titanium oxide or a Ti—O—N layer or a Ti—O—S layer which is a titanium oxide containing nitrogen or sulfur is formed as an outer material.

In this manner, by placing Ti—Cr—O—N or the like as an inner material, visible light of long wavelength can be effectively absorbed and electrons and holes can be produced there. The electrons and holes migrate to $TiO_2$, Ti—O—N, or Ti—O—S at the surface and superior hydrophilicity, contamination prevention, or decomposition of organic matters can be achieved on the surface. In addition, by placing more stable $TiO_2$, Ti—O—N or Ti—O—S on the front-most surface, the long-term stability of the structure can be improved compared to a structure of simply Ti—Cr—O—N or the like.

According to another aspect of the present invention, it is also preferable that the compositional ratios in the outer material and in the inner material gradually change according to the distance from the surface.

The photocatalyst according to this aspect of the present invention basically comprises a titanium compound (Ti—O—N or Ti—O—S) in which a nitrogen atom (N) or a sulfur atom (S) substitutes for a portion of the oxygen sites of a metal oxide such as titanium oxide, is doped at an interstitial site of lattices, or is placed at the grain boundary of polycrystalline body.

Such a metal oxide, for example, Ti—O—N or Ti—O—S in which nitrogen or sulfur is contained in titanium oxide crystals, demonstrates photocatalytic effects when exposed to light in the visible and ultraviolet ranges.

Furthermore, by further doping (co-doping) a metal as described above to Ti—O—N or Ti—O—S, light at even longer wavelengths can also be effectively absorbed.

BRIEF DESCRIPTION OF DRAWINGS

FIG. 4 is a diagram showing an XPS spectrum of a Ti—O—N film.

BEST MODE FOR CARRYING OUT THE INVENTION

Figure 1:
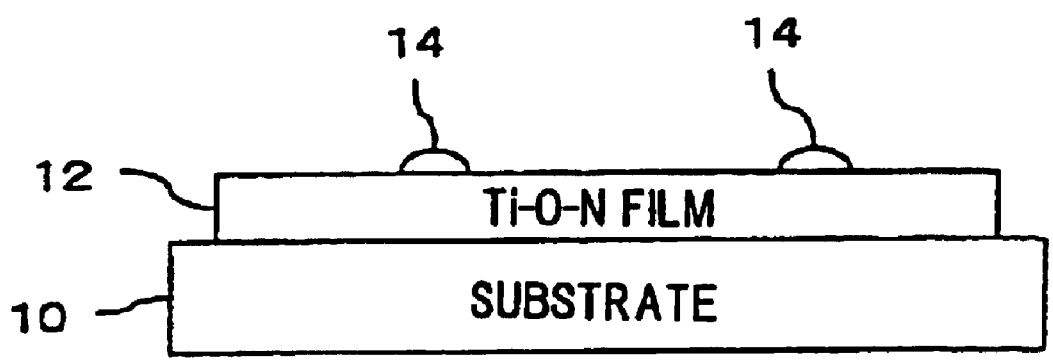
FIG. 1 is a diagram showing a first embodiment of the present invention.

The preferred embodiments of the present invention (hereinafter referred to as "embodiments") will be described in the following while referring to the drawings.

(Embodiment 1)

FIG. 1 shows a structure of a first embodiment of the present invention. In this structure, a Ti—O—N film 12 which is a photocatalytic material is formed on a substrate 10 and Pt and $RuO_2$ are partially deposited on the surface of the Ti—O—N film 12. Various materials, such as glass and ceramic, can be chosen for the substrate 10 according to the desired application.

The Ti—O—N film 12 has a structure in which a nitrogen atom is doped between lattices of $TiO_2$ crystals. The doping of nitrogen atoms can be achieved by any one or any combination of substituting a portion of the oxygen sites of the $TiO_2$ crystals by nitrogen, doping nitrogen atoms at interstitial sites of the lattices of $TiO_2$ crystals, or placing nitrogen atoms at the grain boundary of polycrystalline assembly of $TiO_2$ crystals.

The compositional ratio of each element in the Ti—O—N film 12 may be, for example, $Ti_{31}O_{67}N_2$. Therefore, the Ti—O—N film 12 has a structure which consists primarily of a crystal of $TiO_2$ and is doped with N. The crystal phase of the $TiO_2$ crystal may be either rutile, anatase, or a combination of anatase and rutile.

Figure 2A:
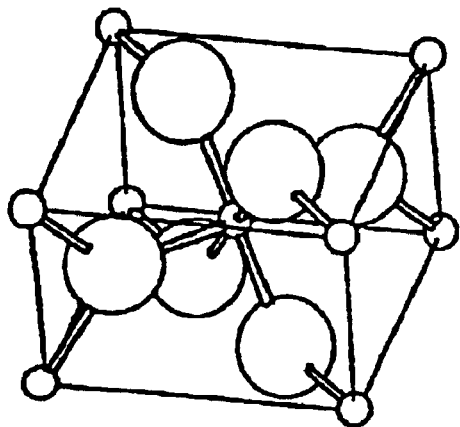
FIGS. 2A and 2B are diagrams showing crystal lattices of $TiO_2$.
Figure 2B:
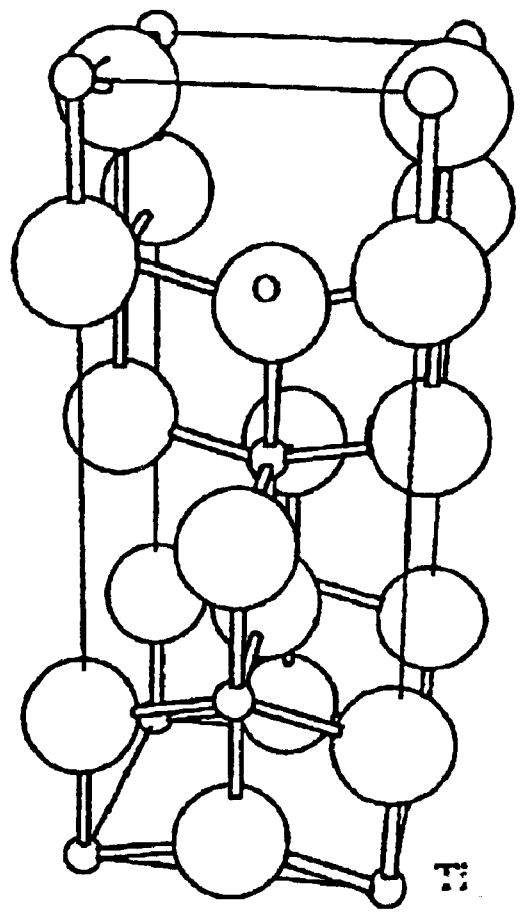

FIG. 2A shows a unit lattice of $TiO_2$ crystal of rutile phase and FIG. 2B shows a unit lattice of $TiO_2$ crystal of anatase phase. In these figures, small circles represent Ti and large circles represent O. N substitutes a portion of O or is introduced at an interstitial site of the crystal lattices or grain boundary of $TiO_2$ crystals so that Ti—O—N is formed.

In parallel to experiments performed by the present inventors, the present inventors have evaluated, through the full-potential linearized-augmented-plane-wave (FLAPW) calculation method, the electron states and optical characteristics of Ti—O—X-based semiconductor photo catalyst in which an anion X is doped. As a result, it was found that N (nitrogen) and S (sulfur) are effective dopants X for allowing operation by visible light. From these results, it has been found that the advantages of doping according to the present invention can be obtained not only when oxygen (O) is substituted by another anion X, but also when the anion X is present at an interstitial site of crystal lattice in a form to deform the lattice or wherein the anion X is present in the crystal grain boundary, or any combination of these cases, as long as a Ti—X bond is present in the photocatalyst having titanium oxide as a base material. Similar advantages can also be obtained by anion doping of amorphous titanium oxide.

Moreover, as long as N is doped in the manner described above, the ratio in the number of atoms between Ti and (O+N) need not be 1:2. For example, the compositional ratio may be $Ti_{31}O_{67}N_2$ as described above, which is excessive in oxygen, or $Ti_{37}O_{61}N_2$, which is somewhat reductive. This also applies to doping of S.

The photocatalytic material may be manufactured, for example, by RF magnetron sputtering. An example manufacturing method will now be described.

First, a substrate 10 and a $TiO_2$ target are set within a vacuum chamber of an RF magnetron sputtering apparatus. A predetermined amount of $N_2$ gas and an inert gas (for example, Ar gas) is introduced into the vacuum chamber and sputtering is performed in ($N_2$+Ar) plasma. In this manner, Ti—O—N film 12 is deposited on the substrate 10.

The total gas pressure during the sputtering may be set at approximately 0.52 Pa and the partial pressure of $N_2$ may be set such that 0%<(partial pressure of $N_2$)≦100%. It is preferable that the partial pressure of $N_2$ be set approximately 20–60%, and be set at, for example, 40%. The input power for $TiO_2$ is, for example, 600 W ★2 using two targets.

After formation of the Ti—O—N film 12 by sputtering, thermal treatment (annealing) is applied for crystallization. For example, a thermal treatment can be applied under a nitrogen atmosphere at 550° C. for approximately 2 hours for crystallization. In other words, when the film is deposited, the film has an amorphous+polycrystalline structure, but by applying a thermal treatment, polycrystallization and single crystallization can be achieved. It is also possible to deposit the Ti—O—N film 12 while heating the substrate 10, and omit the thermal treatment process after film deposition.

After the thermal treatment, Pt is deposited as a charge separation material through sputtering. The Pt target may be set in the vacuum chamber in advance or at a later stage. The amount of deposition of Pt by sputtering is set to correspond to a thicknesses of 1 Å and 5 Å that can be obtained if Pt is assumed to be uniformly deposited over the surface. In this manner, Pt islands are formed on the surface of the Ti—O—N film 12. The charge separation material is not limited to Pt, and can be any of Pd, Ni, $RuO_x$ (for example, $RuO_2$), $NiO_x$ (for example, NiO), $SnO_x$ (for example, $SnO_2$), $Al_xO_y$ (for example, $Al_2O_3$), $ZnO_x$ (for example, ZnO), or $SiO_x$ (for example, $SiO_2$), or any combination of the above materials.

Using the above manufacturing method, a photocatalyst was produced in an example by producing the Ti—O—N film 12 on the substrate 10 and partially depositing Pt on the Ti—O—N film 12. Two photocatalysts were produced respectively having Pt in an amount corresponding to a thickness of 1 Å and of 5 Å.

As comparative examples, a $TiO_2$ film, a Ti—O—N film, and structures in which Pt was partially deposited on $TiO_2$ films in an amount corresponding to 1 Å and 5 Å were produced. The structures in which Pt was partially deposited on $TiO_2$ films were produced as follows. First, a $TiO_2$ target was sputtered in a 20% $O_2$—Ar atmosphere, and then the structure was annealed under $O_2$ atmosphere at 450° C. for 90 minutes for crystallization. Pt was deposited on the surface in an amount corresponding to thicknesses of 1 Å and 5 Å.

Figure 3:
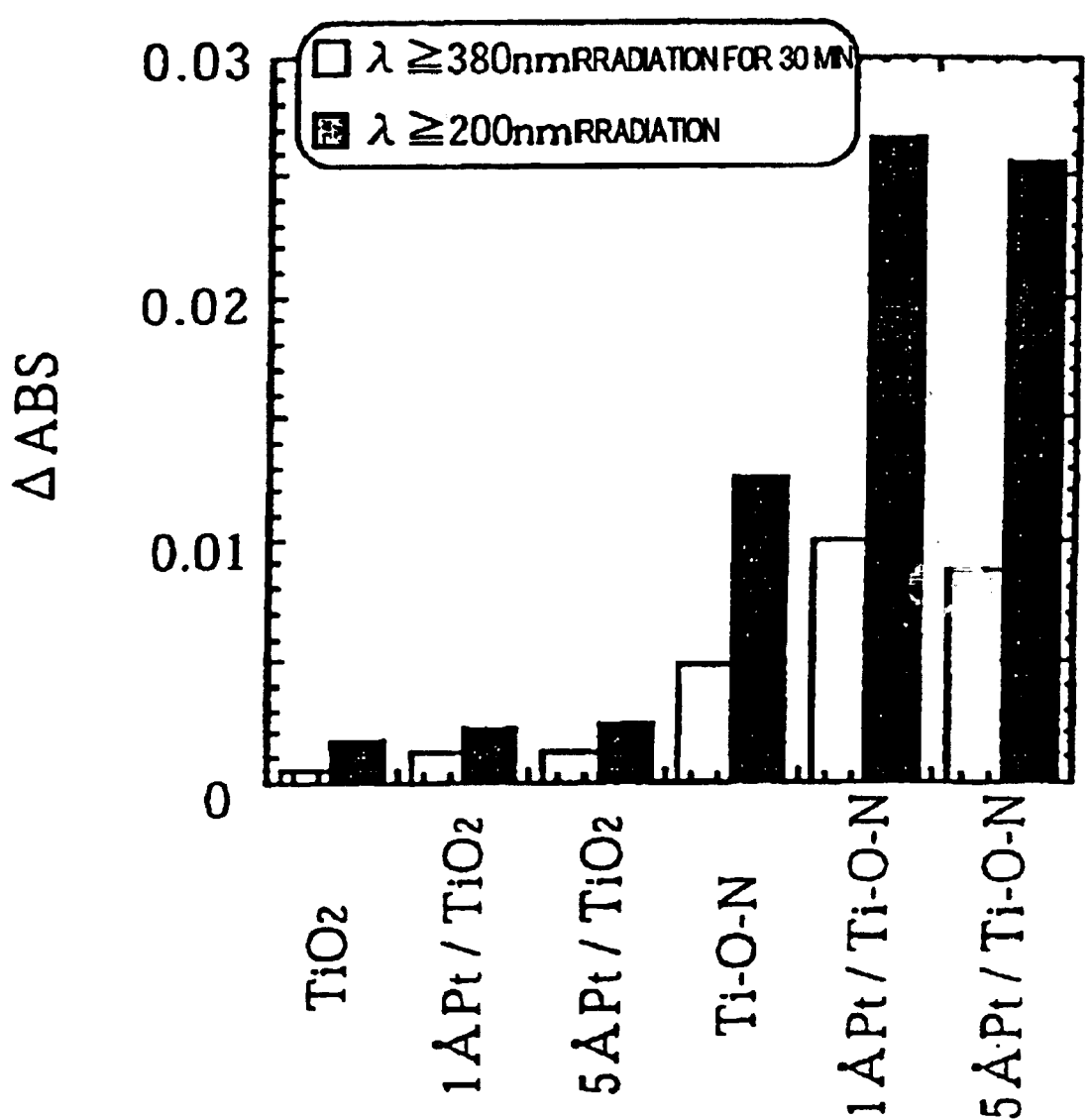
FIG. 3 is a diagram showing the photocatalytic functions of the first embodiment.

FIG. 3 shows a result of measurement of photocatalytic activities of the 6 samples, $TiO_2$, 1 Å $Pt/TiO_2$, 5 Å $Pt/TiO_2$, Ti—O—N, 1 Å Pt/Ti—O—N, and 5 Å Pt/Ti—O—N, formed through the above processes, the measurement represented by the decomposition performance of methylene blue. More specifically, methylene blue was applied to the surface of each film and the decomposition performance involved with light irradiation was measured as a change in absorbance of light having a wavelength of 600 nm (ΔABS). An Xe lamp of 500 W was used as the radiation light source, and tests were performed for cases wherein light including an ultraviolet component having wavelength λ of 200 nm or greater was irradiated and wherein visible light having a wavelength λ of 380 nm or greater was irradiated, wherein the wavelength of irradiated light was limited using an optical filter.

From this result, it can be seen that the performance of Ti—O—N can be significantly improved over that of $TiO_2$ because Ti—O—N exhibits additional photocatalytic reactivity in response to visible light irradiation. It can also be seen that the performance as a photocatalyst can be further improved by a factor of approximately 2 by partially depositing Pt on Ti—O—N. The results for different amounts of Pt, corresponding to a 1 Å thickness and a 5 Å thickness, did not vary significantly.

Ti—O—N will now be explained in more detail. Influences of the amount of doping of nitrogen to the $TiO_2$ crystal on the photocatalytic function were studied through additional experiments. For these experiments, the percent ratio of number of nitrogen atoms in Ti—O—N film prepared under the partial pressure of $N_2$ of 20% was 6.6% before the thermal treatment and 1.4% after the thermal treatment. Similarly, the percent ratio of number of nitrogen atoms in Ti—O—N film prepared under the partial pressure of $N_2$ of 100% was 12.7% before the thermal treatment and 0.5% after the thermal treatment. In Ti—O—N films prepared under the partial pressures of $N_2$ of 40% and 60%, the percent ratios of number of nitrogen atoms in the Ti—O—N film were respectively 1.4% and 1.5% after the thermal treatment. A photocatalytic function was observed in all of the tested Ti—O—N films. Therefore, the nitrogen content of the Ti—O—N film, when the percent ratio of number of atoms is represented by X %, is preferably 0<X <13. The photocatalytic function of the Ti—O—N film is superior in thermally treated films, and it is preferable that the nitrogen concentration after the thermal treatment be few % or less, and it is more preferable that the nitrogen concentration after the thermal treatment be 2% of less.

In the production of the Ti—O—N film 12 as described above, a $TiO_2$ target was used and the Ti—O—N film 12 was formed in a plasma of Ar gas containing $N_2$. However, the Ti—O—N film 12 may also be formed using TiN (titanium nitride) target and in a plasma of gas containing $O_2$. It is also possible to use a combination of $TiO_2$ and TiN as the target. Furthermore, it is also possible to form the Ti—O—N film 12 through vacuum evaporation or ion plating in ($N_2+O_2$) gas using a Ti ingot.

In the example described above, the Ti—O—N photocatalytic material was in the form of a thin film. However, the present invention may also be applied to a structure having, as a base material, a structure wherein a charge separation material is partially deposited on the surface of particulate Ti—O—N which is mixed to a binder material for painting.

Further, Ti—O—N can also be created using the above method for manufacturing as a basis and through various particle creation methods, sol-gel methods, chemical reaction methods, or the like.

In particular, in the Ti—O—N film of the embodiment, a chemical bond is present between N and Ti. More specifically, the chemical bonding states of nitrogen atom were determined from measurement results of a spectrum associated with the 1 s shell of nitrogen N through an XPS (X-ray Photo emission Spectroscopy) using a Mg—Kα ray source as shown in FIG. 4. The nitrogen atom in Ti—O—N of the present embodiment shows a peak in the vicinity of 396–397 eV which is associated with the Ti—N bond.

As described, from the measurement results of the X ray diffraction of the Ti—O—N photocatalyst and XPS, it is clear that a chemical bond is present between Ti atom and N atom in the Ti—O—N having an anatase+rutile crystal structure.

In general, nitrogen atom may sometimes be mixed, during the manufacturing processes, to powders and films that are commercially available as titanium oxide for photocatalysts. However, as shown in FIG. 4, in these nitrogen atoms, a peak appears in the vicinity of 400 eV. In other words, because the nitrogen atoms that are mixed to the conventional titanium oxide form an organic compound or a nitro group, Ti—N bond is not observed. In this manner, nitrogen which is present in the titanium oxide and which is mixed during the manufacturing processes or modified on the surface during post-processing cannot affect the electronic structure of titanium oxide because the chemical characteristics are different.

In addition, in the present embodiment, a charge separation material such as Pt is partially deposited on the surface of the Ti—O—N film 12.

In this manner, by partially depositing onto the surface of the photocatalytic material, recombination of electrons and holes generated by the photocatalytic reaction can be prevented, and it is possible to produce a more efficient photocatalysis reaction.

As the charge separation material to be partially deposited, for example, a metal element such as Ni, Cu, Ru, Rh, Pd, Ag, Pt, Ir, Au, Re, Os, and Nb or an oxide such as $RuO_x$ (for example, $RuO_2$), $NiO_x$ (for example, NiO), $SnO_x$ (for example, $SnO_2$), $Al_xO_y$ (for example, $Al_2O_3$), $ZnO_x$ (for example, ZnO), and $SiO_x$ (for example, $SiO_2$) may be used.

(Embodiment 2)

Figure 5A:
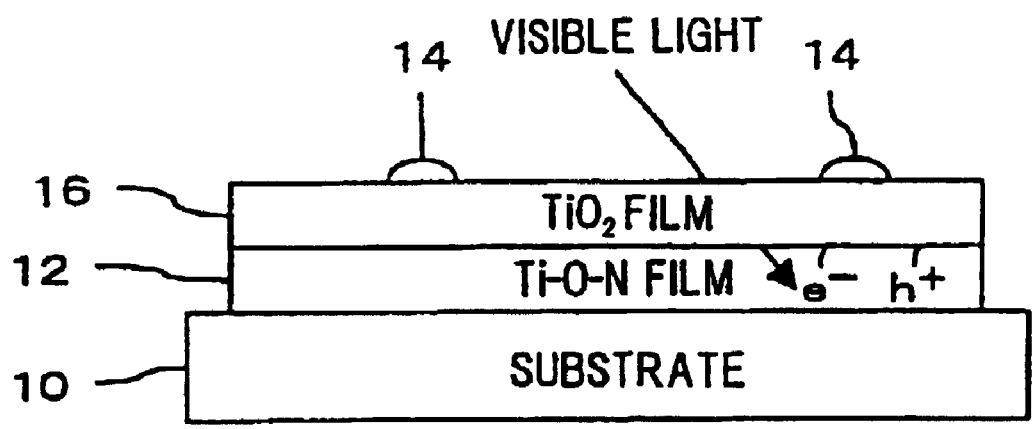
FIGS. 5A and 5B are diagrams showing structures of a second embodiment of the present invention.
Figure 5B:
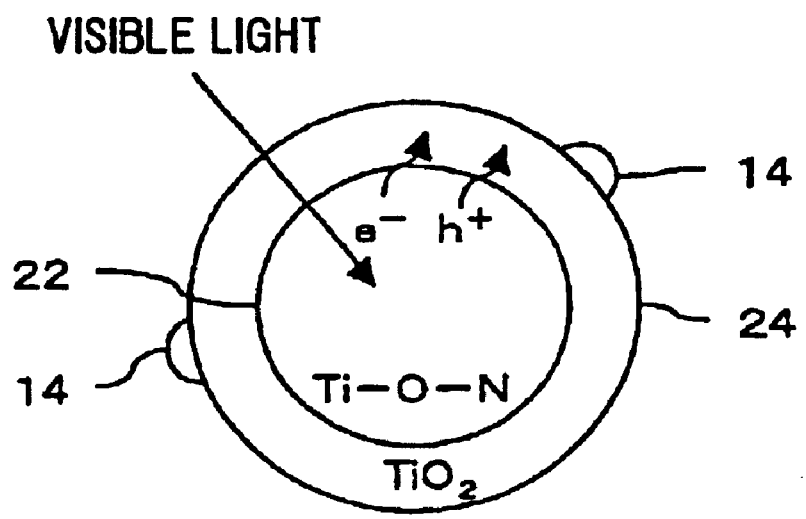
Figure 6:
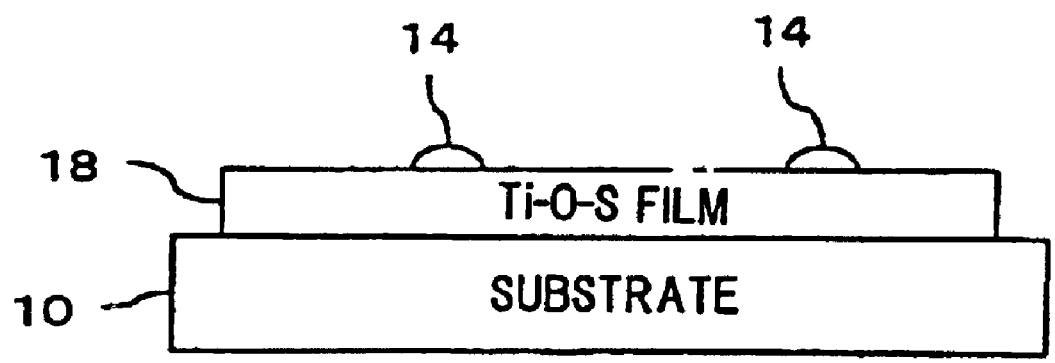
FIG. 6 is a diagram showing a structure of a third embodiment of the present invention.

FIGS. 5A and 5B show structures according to a second embodiment of the present invention. In FIG. 5A, a Ti—O—N film 12 is formed on a substrate 10, a $TiO_2$ film 16 is formed on the Ti—O—N film 12, and a charge separation material 14 is partially deposited on the surface of the $TiO_2$ film. As the charge separation material 14, a metal element such as Ni, Cu, Ru, Rh, Pd, Ag, Pt, Ir, Au, Re, Os, and Nb, or an oxide such as $RuO_x$ (for example, $RuO_2$), $NiO_x$ (for example, NiO), $SnO_x$ (for example, $SnO_2$), $Al_xO_y$ (for example, $Al_2O_3$), $ZnO_x$ (for example, ZnO), and $SiO_x$ (for example, $SiO_2$) may be used.

In FIG. 5A, a layered structure consisting of two layers is employed, but the boundary between the layers becomes less distinct through the thermal treatment or the like, resulting in a structure in which N gradually decreases towards the front surface. In other words, a $TiO_2$/Ti—O—N film having a graded composition is formed in which the number of N atoms decreases towards the front surface, and, at the front-most plane, $TiO_2$ is exposed. It is also possible to maintain a sharp interface between the Ti—O—N and $TiO_2$ films.

The construction method of graded composition is not limited to thermal treatment after the formation of layers of Ti—O—N and $TiO_2$ films, and a graded composition may also be obtained by changing the gas composition of the atmosphere based on the deposition state of the films. More specifically, by gradually reducing the partial pressure of $N_2$ in the atmosphere, $TiO_2$ may be formed on the front surface side.

With such a structure, visible light is absorbed and electrons and holes are produced in the Ti—O—N region (Ti—O—N film 12) near the substrate 10. The electrons and holes are supplied to $TiO_2$ ($TiO_2$ film 16) in the front surface of the film. At the front surface, a photocatalytic effect is realized by the $TiO_2$ film 16.

The metal element which is a charge separation material as described above captures the electrons and the oxide captures the holes. Therefore, recombination of electrons and holes produced by the photocatalytic reaction is prevented and photocatalytic reaction can more efficiently be generated.

It is also preferable that the $TiO_2$/Ti—O—N photocatalyst having a graded composition be in a particulate form as shown in FIG. 5B, having an inner Ti—O—N portion 22 and an outer $TiO_2$ portion 24 with islands of a charge separation material 14 provided on the surface.

In the above description, the photocatalytic material, Ti—O—N, and $TiO_2$ are formed as thin films. The present embodiment, however, can also be applied to a structure in which a base material constructed by partially depositing a charge separation material on the surface of a particulate $TiO_2$/Ti—O—N is mixed into a binder material for painting.

Moreover, it is possible to create a photocatalytic material using the above described method as a base method in conjunction with various particle creation methods, sol-gel method, chemical reaction methods, or the like.

(Embodiment 3)

In a third embodiment of the present invention, a Ti—O—S film 18 is employed in place of the Ti—O—N film 12 as described above. The basic structure is similar to that of the first embodiment with a notable difference being that N is replaced by S.

The method for manufacturing such a structure is as follows. First, sputtering is performed using Ti, $TiO_2$, or TiS (titanium sulfide) as a target in a $SO_2+O_2$+inert gas (for example, Ar) to form a Ti—O—S film. Then, thermal treatment (for example, at 550° C. for 2 hours) is applied to complete the structure. It is also possible to form the Ti—O—S film onto which a charge separation material is partially deposited through other manufacturing methods. It is also possible to create the structure as a particle. It is also possible to use $CS_2$ or $H_2S$ in place of the $SO_2$ gas.

On the surface of the Ti—O—S film 18, a metal element such as Ni, Cu, Ru, Rh, Pd, Ag, Pt, Ir, Au, Re, Os, and Nb, or an oxide such as $RuO_x$ (for example, $RuO_2$), $NiO_x$ (for example, NiO), $SnO_x$ (for example, $SnO_2$), $Al_xO_y$ (for example, $Al_2O_3$), $ZnO_x$ (for example, ZnO), and $SiO_x$ (for example, $SiO_2$) is partially deposited as a charge separation material 14.

Similar to Ti—O—N, Ti—O—S is a semiconductor which absorbs visible light and generates electrons and holes, and which functions as a photocatalyst with visible light as the operating light. The photocatalytic function is augmented by the charge separation material. Therefore, similar to the first embodiment, the photocatalyst of the third embodiment with a charge separation material partially deposited on the surface of Ti—O—S film realizes similar photocatalytic function with the visible light as the operational light.

It is also preferable to use a structure in which the Ti—O—N film 12 of the second embodiment is replaced with a Ti—O—S film 18. In this case, $TiO_2$ film can be formed on the Ti—O—S film 18 in a manner similar to that in the second embodiment. With such a structure, similar to the second embodiment, effective photocatalytic function can be realized with the visible light as the operational light.

As described, Ti—O—N and Ti—O—S can be created easily and at low cost using a method such as, for example, introducing nitrogen gas or sulfur dioxide gas to the atmosphere during sputtering. In this manner, it is possible to realize photocatalytic function responsive to not only ultraviolet light, but also visible light as the operating light. In addition, by placing a charge separation material on the surface of such a photocatalytic material, it is possible to prevent recombination of the produced electrons and holes, and thereby increase photocatalytic functionality and effectiveness.

(Embodiment 4)

Figure 7:
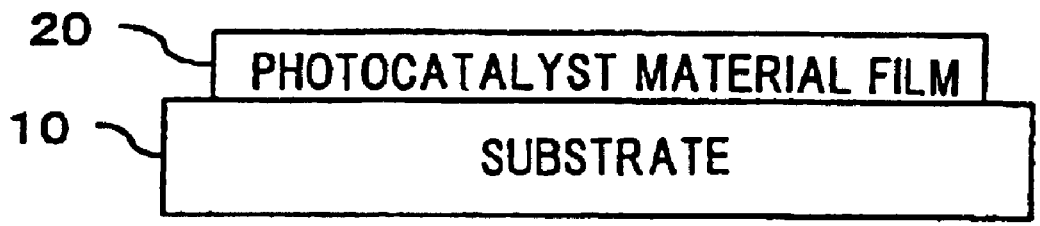
FIG. 7 is a diagram showing a structure of a fourth embodiment of the present invention.

FIG. 7 is a diagram showing a structure according to a fourth embodiment of the present invention. A film 20 of a photocatalytic material is formed on a substrate 10. Various materials such as $SiO_2$, glass, and ceramic may be chosen for the substrate 10 as suits the intended application.

The photocatalytic material 20 is formed by doping a nitrogen atom (N) or a sulfur atom (S) into a crystal of an oxide of a metal M1 chosen from among titanium (Ti), zinc (Zn), and tin (Sn) and doping at least one of the metal elements M2 chosen from among vanadium (v), chromium (Cr), manganese (Mn), iron (Fe), cobalt (Co), nickel (Ni), copper (Cu), zinc (Zn), ruthenium (Ru), rhodium (Rd), rhenium (Re), osmium (Os), palladium (Pd), platinum (Pt), iridium (Ir), niobium (Nb), and molybdenum (Mo).

The results of the ion injection as described above suggest that it is important to introduce a metal dopant to the Ti site without cohesion. In the present invention, because of the simultaneous introduction of a metal element M2 and N or S, a photocatalyst which can operate not only under ultraviolet light, but also under visible light can be realized.

In parallel to experiments performed by the present inventors, the present inventors evaluated, using a full-potential linearized-augmented-plane-wave (FLAPW) calculation method, the electron states of Ti—O—X based semiconductor photocatalysts in which the O site is substituted by another element (=B, C, N, F, P, S) and electron states of Ti—M2—O based semiconductor photocatalysts in which the Ti site is substituted by a metal element M2 (=V, Cr, Mn, Fe, Co, Ni, Cu, Zn, Nb, Mo, Ru, Rh, Pt, Re, Os, Pd, Ir).

Figure 8:
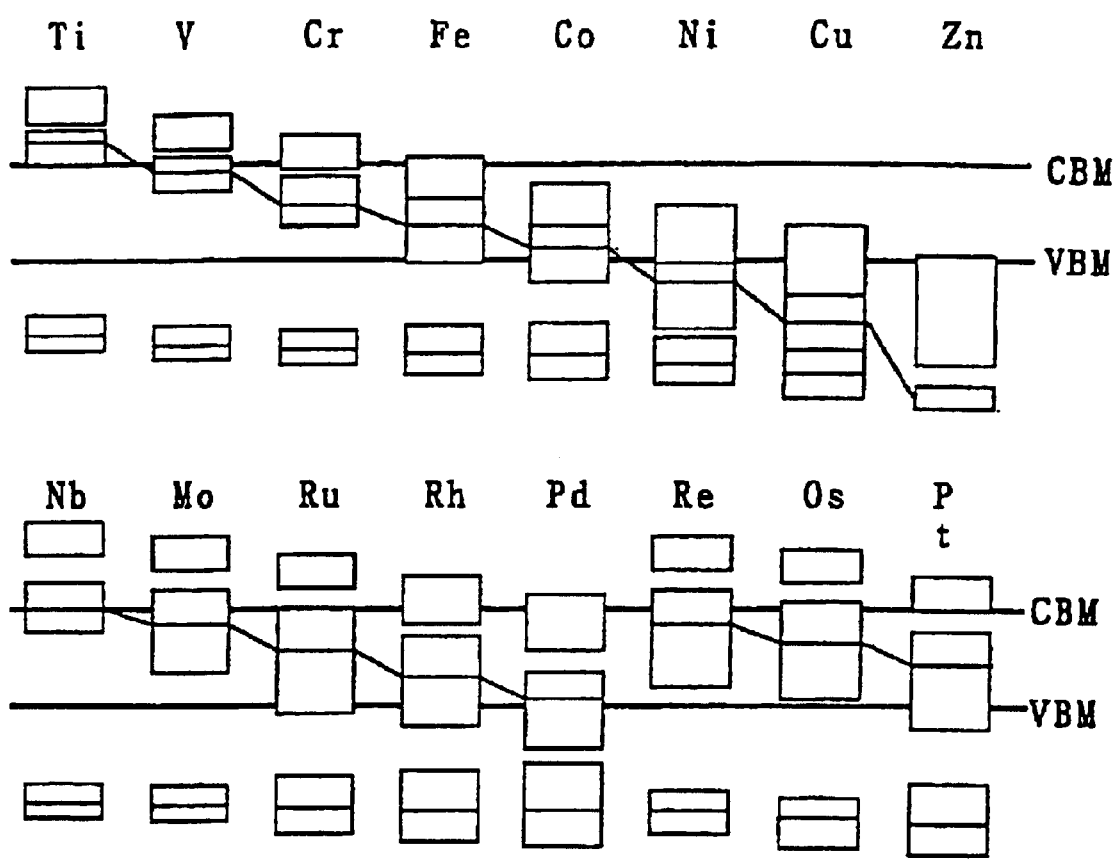
FIG. 8 is a diagram showing the density of states of Ti—M2—O.

FIG. 8 shows a diagram of the density of states based on the calculation result of the first principle calculation (FLAPW).

The unit cell used in the calculation was a cell in which the Ti site was substituted by a metal element M2 (=V, Cr, Mn, Fe, Co, Ni, Cu, Zn, Nb, Mo, Ru, Rh, Pt, Re, Os, Pd, Ir). In FIG. 8, CBM indicates the conduction band minimum and VBM indicates the valence band maximum. Each rectangle indicates a newly formed optical absorption band. As shown in the results, a new light absorption band is produced in the band gap of $TiO_2$ as a result of the metal substitution. Therefore, absorption of visible light by these metal elements can be expected.

Figure 9:
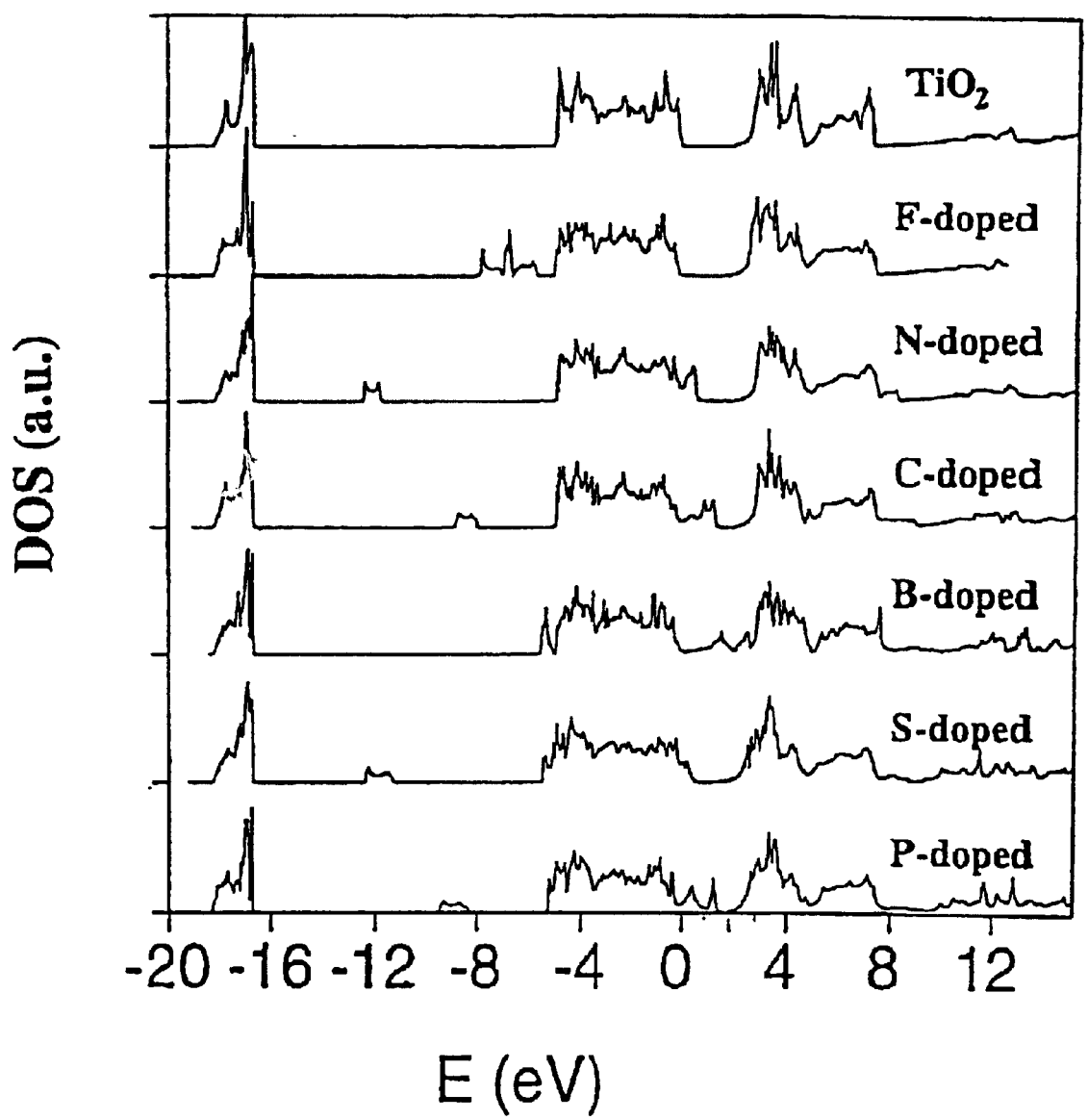
FIG. 9 is a diagram showing the density of states of Ti—O—X.

FIG. 9 shows results of computation of density states obtained when the O site is substituted by another element (=B, C, N, F, P, S).

As is apparent from these results, an absorption band is produced in the vicinity of the valence band maximum (VBM) of TiO2 because of the substitution by N and S. Therefore, absorption of visible light by these substituted elements can be expected.

In addition, the electron states of Ti—O—M2—X (X=N, S) based semiconductors in which both elements were doped was also calculated. As a result, it has been found that the structure is more stable with respect to energy when the M2 and N or S are at adjacent sites than when the M2 and N or S are separated. Therefore, it can be expected that deficiencies due to doping such as, for example, increase in the number of recombination centers, decrease in the carrier mobility, and solubility limit of M2 and N or S can be reduced because of the stable bonding state of M2 and N or S as described above.

In fact, in the density of states introduced to the band gap of $TiO_2$ by simultaneous substitution of a metal element M2 such as Ni, Cu, Pd, Pt, etc. and N, because the energy levels are nearby, a strong hybridized state is formed by interaction. It has been confirmed that, because of this, the localized density of states in the band gap by M2 is altered by the simultaneous substitution to be delocalized one. Therefore, the effects of the potential change caused by the simultaneous substitution are small compared to cases of substitution of just M2 or X alone, and formation of recombination centers is unlikely.

The calculation results described above are reflected in models in which the Ti site is substituted by M2 and oxygen site is substituted by X, but the structure of the present invention is not limited to the examples described above. In other words, the present invention encompasses any titanium compound in which a nitrogen atom or a sulfur atom substitute for a portion of the oxygen site of titanium oxide crystal, is doped at an interstitial site of lattices of titanium oxide crystals, or is placed at the grain boundary of polycrystalline assembly of titanium oxide crystals, and at least one of vanadium, chromium, manganese, iron, cobalt, nickel, copper, zinc, ruthenium, rhodium, rhenium, osmium, palladium, platinum, iridium, niobium, and molybdenum substitutes a portion of the metal site, is doped at an interstitial site of lattices of titanium oxide crystals, or is placed at the grain boundary of the polycrystalline assembly of titanium oxide crystals can alter the electron states of the titanium oxide, and can enable absorption of visible light.

Here, it is preferable that the N or S has a chemical bond with M1 in the oxide crystal of M1. In other words, by including such a chemical bond of M1-N, absorption of visible light is enabled. In addition, by doping a metal element M2, further absorption of visible light can be enabled.

Such a photocatalytic material film 20 can be obtained by, for example, sputtering under a nitrogen atmosphere using an oxide of a metal M1 and a metal M2 as targets.

Next, as a specific example of the present embodiment, a photocatalytic material having a Ti—Cr—O—N structure in which N and Cr are doped to a $TiO_2$ crystal will be described.

In this example, the photocatalytic material was produced through RF magnetron sputtering. As the targets, a $TiO_2$ target and a Cr target each having a diameter of 4 inches were used. With these targets, sputtering was performed in a 40% $N_2$—Ar atmosphere and 0.5 Pa and thermal treatment was applied at 550° C. in a $N_2$ atmosphere for 90 minutes for crystallization, and a Ti—Cr—O—N film was produced. The input power were 600W ★2 for $TiO_2$ and the input power for Cr was varied in a range of 10–40 W.

An additional $TiO_2$ film was formed for comparison purposes. For this structure, the target was sputtered in a 20% $O_2$—Ar atmosphere, and thermally treatment was applied at 450° C. in an $O_2$ atmosphere for 90 minutes for crystallization.

The crystallinity of the Ti—Cr—O—N film was observed through X ray diffraction, and both diffraction lines of anatase $TiO_2$ and rutile $TiO_2$ have been observed. No diffraction lines were observed which are associated with a Cr compound or TiN.

Figure 10:
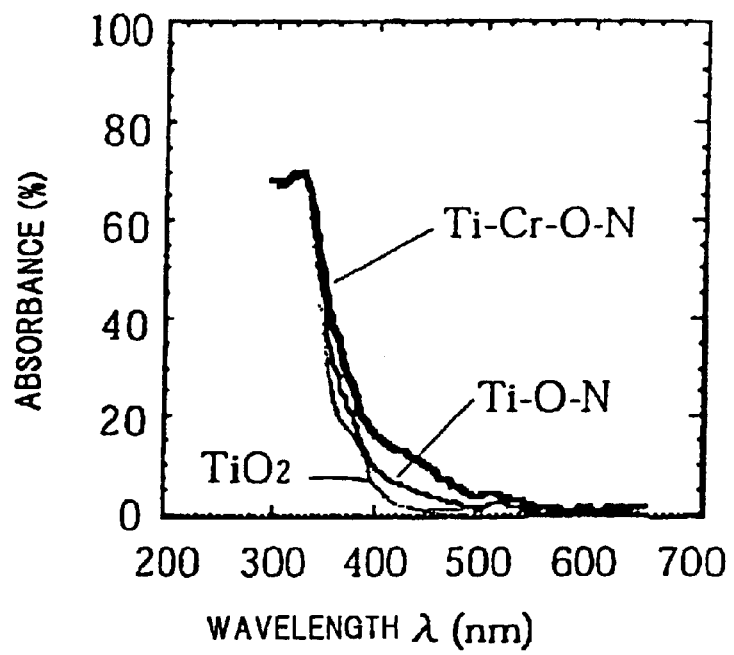
FIG. 10 is a diagram showing light absorbance of Ti—O—M2—X.

FIG. 10 shows the light absorption spectrum of the film. In the Ti—Cr—O—N film, the absorption edge is shifted towards a longer wavelength compared to the $TiO_2$ film. This is because one or more new levels are formed within the band gap of $TiO_2$ by the Cr and N doping such that the effective band gap is narrower.

The photocatalytic function of the film was evaluated through decomposition performance of methylene blue. This evaluation was performed by measuring the decomposition performance of methylene blue applied onto the surface of the Ti—Cr—O—N film as changes in absorbance ($\Delta ABS$) of the film at a wavelength of 600 nm. An 500 W Xe lamp was used as the irradiation light source. Tests were performed wherein light including an ultraviolet component having a wavelength $\lambda$ of 200 nm or greater was irradiated and wherein visible light having a wavelength $\lambda$ of 380 nm or greater was irradiated by using an optical filter limit the wavelengths of the irradiated light.

Figure 11:
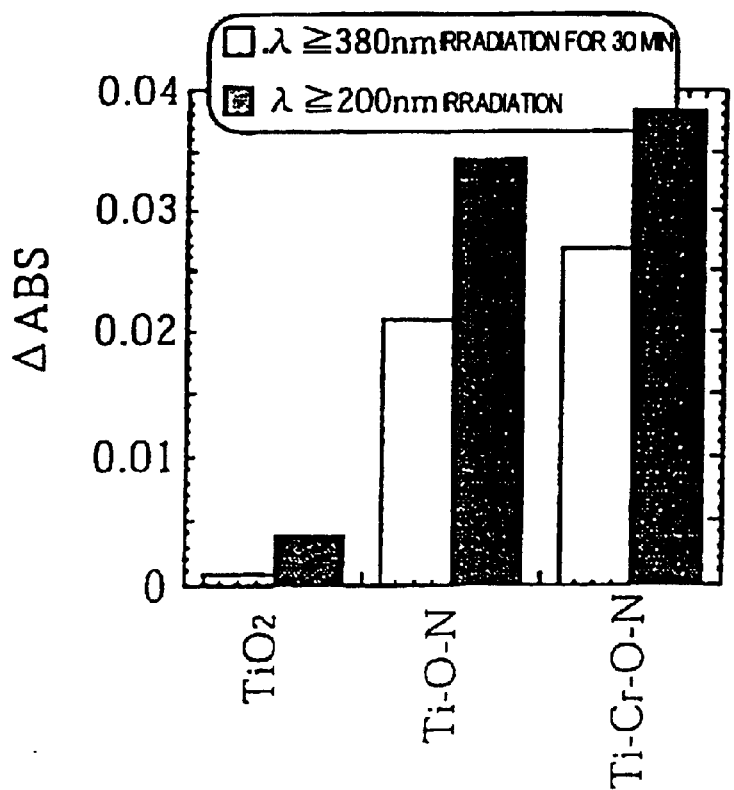
FIG. 11 is a diagram showing photocatalytic functions of the fourth embodiment.

FIG. 11 shows the experimental results. As shown, with Ti—O—N, higher catalytic activity can be obtained in the range from ultraviolet through visible light ($\lambda \geq 200$ nm), compared to $TiO_2$. In addition, it can be seen that the catalytic activity is further improved in Ti—Cr—O—N. This is because the catalytic activity in response to visible light having $\lambda$ of 380 nm or greater was enhanced by the Cr and N doping. It can be seen that this result reflects the light absorption spectrum characteristic shown in FIG. 10.

As shown in FIG. 11, the Ti—Cr—O—N photocatalytic material exhibits photocatalytic function when irradiated with visible light. In other words, with a Ti—Cr—O—N photocatalytic material, photocatalytic function not only in response ultraviolet light, but also in response to visible light, can be realized, and improvements in hydrophilicity (reduction in the contact angle of water) and decomposition of organic matters can be obtained. Therefore, Ti—O—N can not only operate with visible light as the operating light, but, as a result, exhibits significantly improved photocatalytic function by using light in the range from ultra violet through visible light.

As described above, from the measured results of X ray diffraction and XPS of the Ti—O—N photocatalyst according to the present invention, it is clear that a chemical bond is present between Ti atom and N atom within Ti—O—N which has a crystal structure of a combination of anatase and rutile.

In general, nitrogen atom may sometimes be mixed into powders and films that are commercially available as titanium oxide for photocatalysis during their manufacturing processes. However, as shown in FIG. 4, in these nitrogen atoms, a peak appears in the vicinity of 400 eV. In other words, because the nitrogen atoms that are mixed into the conventional titanium oxide form an organic compound or a nitro group, Ti—N bonding is not observed. Therefore, nitrogen which is present in the titanium oxide and which is mixed during the manufacturing processes or modified on the surface during post-processing have different chemical characteristics.

In the present embodiment, by further doping Cr or the like, the electronic states can be further changed so that the efficiency for the use of the visible light can be improved.

Next, results of methylene blue decomposition experiments for Ti—(Co, Cu, Ni)—O—N photocatalysts in which other metals are doped along with N are shown in Table 1. The performance of photocatalysts for irradiation light having a wavelength $\lambda$ of 380 nm or greater depends on the amount of doping. The results shown in Table 1 are the maximum values for each system. Although the catalytic activity slightly varies depending on the type of dopant, a catalytic activity of one order of magnitude higher than that for $TiO_2$ can be achieved by doping each of these metals and N.

The compositional ratios in these structures were $Ti_{26}Co_1O_{71}N_2$ and $Ti_{27}Ni_1O_{70}N_2$. Both of these compositional ratios are heavy in oxygen, but the compositional ratio is not limited to such condition and a reductive compositional ratio such as, for example, $Ti_{33}Ni_2O_{63}N_2$ may also be used. In the bonding energy spectrum of 1 s shell of N in an XPS analysis using Mg—K$\alpha$ ray, a peak associated with the bonding between an N atom and a metal atom was observed in the vicinity of 396–397 eV.

This range of compositional ratios of oxygen is similar when S doping is used in place of N.

TABLE 1

| PHOTOCATALYST | AMOUNT OF MB DECOMPOSITION (IN UNITS OF VALUE FOR TiO2) |
|---|---|
| TiO2 | 1.0 |
| Ti-O-N | 24.1 |
| Ti-Cr-O-N | 30.6 |
| Ti-Co-O-N | 29.2 |
| Ti-Cu-O-N | 24.2 |
| Ti-Ni-O-N | 29.8 |

As a metal element M2, in addition to Cr, vanadium (V), manganese (Mn), iron (Fe), cobalt (Co), nickel (Ni), copper (Cu), zinc (Zn), ruthenium (Ru), rhodium (Rh), rhenium (Re), osmium (Os), palladium (Pd), platinum (Pt), iridium (Ir), niobium (Nb), molybdenum (Mo) or the like can be used. The metal element to be used is not limited to use of just one of these, and two or more of these metal elements can be used in combination.

In the present invention, at least one metal element M2 of palladium, chromium, manganese, iron, cobalt, nickel, copper, zinc, ruthenium, rhodium, rhenium, osmium, platinum, palladium, iridium, niobium, and molybdenum substitutes a portion of M1 sites of an oxide crystal, is doped at an interstitial site of the oxide crystal lattices, or is placed in the grain boundary of polycrystalline assembly of oxide crystals.

In addition, although in the above example Ti—O was used as a base material, a photocatalyst exhibiting a similar photocatalytic function can also be obtained by doping at least one metal M2 and nitrogen or sulfur (or N+S) to an oxide semiconductor such as, for example, ZnO, $SrTiO_3$, $SnO_2$, $WO_3$, $ZrO_2$, $Nb_2O_5$, $Fe_2O_3$, $Cu_2O$, $FeTiO_3$.

In the above description, an example was described wherein a thin film was deposited by sputtering. However, the photocatalytic characteristic is intrinsic to the material, and similar characteristic can be obtained in a thin film formed through evaporation, a thin film formed through sol-gel method, or in the form of a fine particle.

(Embodiment 5)

Figure 12A:
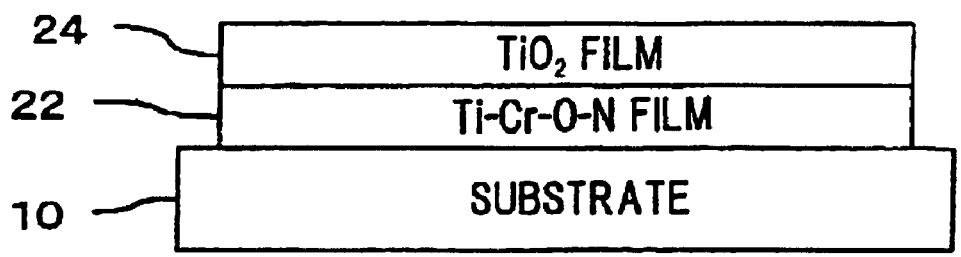
FIGS. 12A and 12B are diagrams showing a structure of a fifth embodiment of the present invention.
Figure 12B:
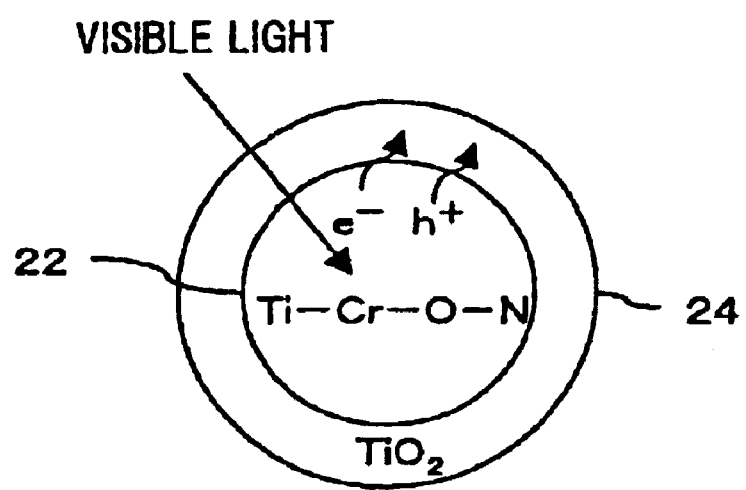

FIGS. 12A and 12B show a fifth embodiment of the present invention. In FIG. 12A, a Ti—Cr—O—N film 22 is formed on a substrate 10 and a $TiO_2$ film 24 is formed thereon.

In FIGS. 12A and 12B, a layered structure of two layers is employed, but, through processes such as thermal treatment, the interlayer boundary between the two layers becomes less distinct, and a structure in which the amounts of N and Cr decrease towards the front surface is obtained. More specifically, a $TiO_2$/Ti—Cr—O—N film is formed which has a graded composition in which the amounts of N and Cr atoms become smaller as the front surface is approached and $TiO_2$ is exposed at the front-most surface. Alternatively, a sharp interface between the Ti—Cr—O—N film 22 and the $TiO_2$ film 24 can also be maintained.

In addition to thermal treatment after the formation of layers of Ti—Cr—O—N film 24 and the $TiO_2$ film 24, a graded composition may also be obtained by varying the gas composition of the atmosphere and conditions for sputtering Cr based on the deposition state of the film. More specifically, by gradually decreasing the partial pressure of $N_2$ in the atmosphere and the amount of Cr sputtering, it is possible to obtain $TiO_2$ at the front surface.

In such a structure, visible light is absorbed by the Ti—Cr—O—N region (Ti—Cr—O—N film 22) closer to the substrate 10 and electrons and holes are formed. These electrons and holes are supplied to $TiO_2$ ($TiO_2$ film 24) at the front surface of the film. At the front surface, the photocatalytic function is realized by the $TiO_2$ film 24.

A $TiO_2$ film is stable and particularly superior in hydrophilicity, and receives the electrons and holes from the inside so that preferable functions such as hydrophilic disinfection function and contamination prevention are achieved.

It is also preferable to form the $TiO_2$/Ti—Cr—O—N photocatalyst in a particulate form as shown in FIG. 12B in which a Ti—Cr—O—N portion 22 is provided inside and a $TiO_2$ portion 24 is provided on the outside. It is preferable that such particulate photocatalyst be mixed to a binder for paint and employed as a paint.

In addition, various M1—M2—O—N can be used in place of Ti—Cr—O—N of the Ti—Cr—O—N film 22 in this embodiment. Moreover, it is also preferable to use Ti—O—N in place of $TiO_2$ in the $TiO_2$ film 24. Ti—O—N is stable and is superior in functions such as decomposition of organic substances. Thus, by using Ti—O—N as the outside material, a characteristic photocatalytic function can be achieved.

Moreover, by partially depositing, on the surface of the photocatalytic material according to the present invention, at least one of a metal element such as Pt, Pd, and Ni, or an oxide such as ruthenium oxide, tin oxide, zinc oxide, aluminum oxide, and nickel oxide, it is possible to form a photocatalyst having an enhanced activity.

As described, M1—M2—O—N (or S) can be created easily and at low cost through methods such as, for example, sputtering the oxide of M1 while introducing nitrogen gas, sulfur dioxide gas, hydrogen sulfide gas, or carbon sulfide gas to the atmosphere, and then sputtering M2. With such a structure, a photocatalytic function can be realized having the visible light as the operational light. By introducing M2, one or more new levels is created in the band gap, and it is possible to further shift the light absorption characteristic towards a longer wavelength.

Industrial Applicability

A photocatalyst according to the present invention can be placed on the surface or the like of various products for decomposition of organic matters and anti-fogging.

What is claimed is:

1. A photocatalyst comprising:
   a titanium compound in which a nitrogen atom or a sulfur atom is substituted for a portion of oxygen sites of a titanium oxide crystal, in which the same is doped at an interstitial site of the crystal lattices of titanium oxide, or, in which the same is placed at a grain boundary of a polycrystalline body of the titanium oxide crystals; and
   a charge separation material partially supported on the surface of the titanium compound.

2. A photocatalyst comprising:
   a titanium compound in which a nitrogen atom or a sulfur atom is substituted for a portion of oxygen sites of a titanium oxide crystal, in which the same is doped at an interstitial site of the crystal lattices of the titanium oxide, or, in which the same is placed at a grain boundary of the polycrystalline body of the titanium oxide crystals, and in which at least one of vanadium, chromium, manganese, iron, cobalt, nickel, copper, zinc, ruthenium, rhodium, rhenium, osmium, palladium, platinum, and iridium is substituted for a metal site of the titanium oxide crystal, in which the same is doped at an interstitial site of the crystal lattices of titanium oxide, or, in which the same is placed at a grain boundary of the polycrystalline body of titanium oxide crystals; and
   a charge separation material partially supported on the surface of the titanium compound.

3. A photocatalyst according to claim 1 or 2, wherein the charge separation material is at least one metal selected from the group consisting of Pt, Pd, and Ni.

4. A photocatalyst according to claim 1 or 2, wherein the charge separation material is at least one oxide selected from the group consisting of $RuO_2$, $NiO_2$, $SnO_2$, $Al_2O_3$, ZnO, and $SiO_2$.

5. A photocatalyst comprising:
   a titanium compound in which a nitrogen atom is substituted for a portion of oxygen sites of titanium oxide crystal, in which the same is doped at an interstitial site of the crystal lattices of titanium oxide, or, in which the same is placed at a grain boundary of the polycrystalline body of titanium oxide crystals; and
   at least one of Pt, Pd, Ni, $RuO_2$, $NiO_2$, $SnO_2$, $Al_2O_3$, ZnO, and $SiO_2$ is partially supported on the surface of the titanium compound.

6. A photocatalyst comprising:

an inner material comprising a titanium compound in which a nitrogen atom or a sulfur atom is substituted for a portion of oxygen sites of a titanium oxide crystal, in which the same is doped at an interstitial site of the crystal lattices of the titanium oxide crystal, or, in which the same is placed at a grain boundary of polycrystalline body of the titanium oxide crystal;

a titanium oxide layer formed on the surface of the inner material; and a charge separation material partially supported on the surface of the titanium oxide layer.

7. A photocatalyst comprising:

an inner material comprising a titanium compound in which a nitrogen atom or a sulfur atom is substituted for a portion of the oxygen sites of 2 titanium oxide crystal, in which the same is doped at an interstitial site of crystal lattices of the titanium oxide, or, in which the same is placed at a grain boundary of the polycrystalline body of titanium oxide crystal, and in which at least one of vanadium, chromium, manganese, iron, cobalt, nickel, copper, zinc, ruthenium, rhodium, rhenium, osmium, palladium, platinum, and iridium substitutes for a portion of the metal sites of the titanium oxide crystal, in which the same is doped at an interstitial site of the crystal lattices of titanium oxide, or, in which the same is placed at a grain boundary of a polycrystalline body of the titanium oxide crystal;

a titanium oxide layer formed on the surface of the inner material; and a charge separation material is partially supported on the titanium oxide layer.

8. A photocatalyst according to claim 6 or 7, wherein the compositional ratios in the titanium oxide layer and in the inner material gradually change from the front surface towards the inside.

9. A photocatalytic material comprising:

an oxide crystal of a metal element M1 having a photocatalytic function in which a nitrogen atom or a sulfur atom is substituted for a portion of oxygen sites, in which the same is doped at an interstitial site of the crystal lattices of an oxide, or, in which the same is placed at a grain boundary of a polycrystalline body of the oxide crystal; and at least one metal element M2 of vanadium, chromium, manganese, iron, cobalt, nickel, copper, zinc, ruthenium, rhodium, rhenium, osmium, palladium, platinum, iridium, niobium, and molybdenum which substitutes for a portion of the M1 sites of the oxide crystal, in which the same is doped at an interstitial site of the crystal lattices of the oxide, or, in which the same is placed at a grain boundary of a polycrystalline body of the oxide crystal.

10. A photocatalytic material according to claim 9, wherein the metal element M1 is any one of titanium, zinc, and tin.

11. A photocatalyst comprising:

an inner material comprising a photocatalytic material according to either claim 9 or 10; and an outer material formed on the surface of the inner material, the outer material comprising a titanium oxide layer or a titanium oxide layer containing nitrogen or sulfur.

12. A photocatalyst according to claim 11, wherein the compositional ratios in the outer material and in the inner material gradually change according to the distance from the front surface.

* * * * *